R. Sparks,
Sharpening Rotary Saws.
N° 46,951.  Patented Mar. 21, 1865.
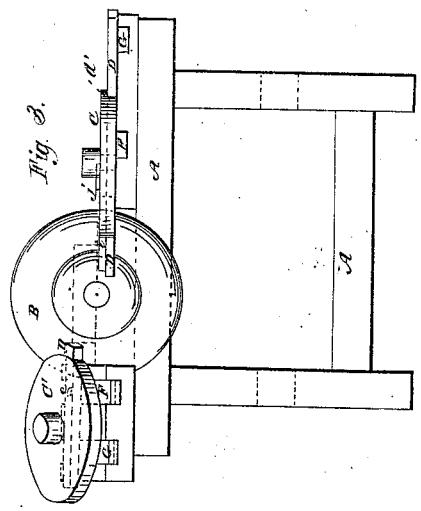
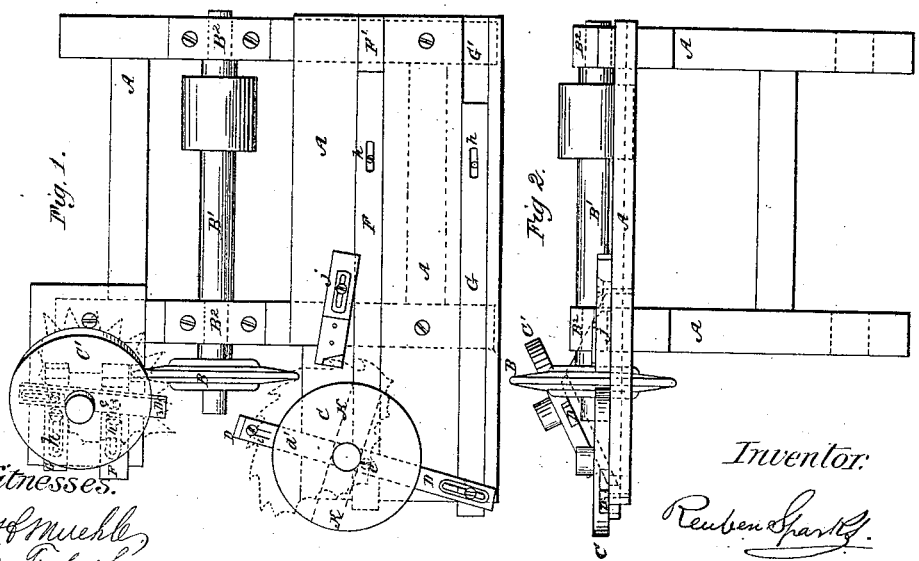
Witnesses.  Inventor.

UNITED STATES PATENT OFFICE.

REUBEN SPARKS, OF BUFFALO, NEW YORK.

IMPROVED MACHINE FOR SHARPENING SAWS.

Specification forming part of Letters Patent No. 46,951, dated March 21, 1865.

*To all whom it may concern:*

Be it known that I, REUBEN SPARKS, of the city of Buffalo, county of Erie, and State of New York, have invented a certain new and Improved Machine for Sharpening Saws; and I do hereby declare that the following is a full, clear, and exact description of the construction and operation thereof, reference being had to the accompanying drawings, making a part of this specification, in which—

Figure I is a plan of my improved machine. Fig. II is a side elevation of same, and Fig. III is an end elevation of same.

The nature of this invention consists in the combination, with a revolving grinding-wheel or stone, of a sliding disk or saw-table moving on an adjustable guide or guides, so arranged as to permit any required variation in the angle of the line of motion of the saw-table to the axis of the grinding-wheel, and also in the relative position of the saw-table and grinding-wheel to adapt the machine to saws of different diameters and forms of teeth.

Letters of like name and kind refer to like parts in each of the figures.

A represents the frame of the machine, which sustains the several operating parts thereof.

B represents the grinding wheel or stone mounted upon one end of the arbor B', which has journal-bearings B² in the top rails of the frame A. This wheel or stone has a thin convex edge and slightly crowning or conical sides, but wheels of different shapes and sizes, according to the form of the saw-tooth to be sharpened, may be used.

C or C' represents the sliding disk or saw-table, upon which the saw is laid to be presented to the action of the grinding-wheel. As shown at C, the plane of its surface is parallel with and passes through the axis of the grinding-wheel, which, in my judgment, is the best position when the saw to be sharpened is a slitting-saw, since its grinds the cutting edge of the saw-teeth at right angles to the sides of the saw. It may, however, be made to assume a slight angle to the axis of the grinding-wheel if desired. As shown at C', the plane of the table is inclined at an angle of twenty-five or thirty degrees to the axis of the grinding-wheel, which causes the saw to be presented to the grinding-wheel in the proper position to give the required bevel to the teeth for a crosscut saw. The adjustment and manner of operating these saw-tables C and C' being similar, their only difference being in their angle to the axis of the grinding-wheel to adapt the machine for both slitting and crosscut saws, a description of one will answer for both, the corresponding parts of each being designated by like letters.

D represents the guide-bar, upon which the sliding table, and with it the saw, is moved to and from the grinding-wheel. A groove is cut in the under side of the table, as shown at d, into which the guide-bar D fits, so that the sliding motion of the table must be parallel to the direction of the guide-bar.

The normal position of the guide-bar is at right angles to the axis of the grinding-wheel, but it is made adjustable by being connected at or near its center, as shown at e, to the adjusting bar or slide F, and at its end to the bar or slide G, these bars moving in grooves F' and G' in the frame A parallel to the axis of the grinding-wheel.

By the parallel and equal movement of the adjusting-bars F and G in their grooves F' and G' the distance of the guide-bar D from the grinding-wheel may be regulated according to the diameter of the saw to be sharpened, while by the single movement of the bar G the guide-bar is caused to turn on its center e, so as to give it any required angle to the axis of the grinding-wheel to insure the proper presentation of the saw-teeth to the action of the grinding-wheel. The adjusting-bars when set are held firmly by means of set-screws h.

For circular-saws, for which the machine is specially adapted, the saw-table is provided with a central boss or hub, which passes through the eye of the saw when laid thereon and forms a center upon which the saw is turned to present the teeth successively and uniformly to the action of the grinding-wheel. In Fig. I the saw is represented in position upon the table by the dotted red lines.

The distance and angle of the guide-bar proper for the saw to be sharpened being obtained, the operator lays the saw upon the sliding table, and, holding it firmly down with his hands, presents a tooth to the action of the grinding-wheel by pushing the table along on the guide-bar until it strikes the adjustable stop $i$ on the guide-bar, which should be so set that this will occur just after the saw-tooth comes in contact with the grinding-wheel.

As a further guide to secure the proper presentation of the saw-tooth to the grinding-wheel, a guide-stop, $j$, (also adjustable,) is secured to the frame A in such position that the tooth of the saw next behind the one being or to be sharpened will strike it at the same time that the table strikes the stop $i$.

The tooth last presented to the action of the grinding-wheel being sharpened, the saw-table is drawn back on the guide-bar and the saw turned one tooth in advance and again presented to the action of the grinding-wheel, and this operation being repeated at each successive tooth a perfect uniformity in the length, depth, and form of the teeth is obtained.

To adapt the machine for sharpening rectilinear or mill-saws it is simply necessary to provide the table with a straight guide placed at right angles to the guide-bar D, as shown by the dotted lines $k$.

Having thus described my invention, what I claim, and desire to secure by Letters Patent, is—

The combination of the grinding-wheel B, sliding saw-table C or C′, and adjustable guide-bar D, for the purposes and substantially as set forth.

REUBEN SPARKS.

Witnesses:
B. H. MUEHLE,
W. H. FORBUSH.